US006154732A

United States Patent [19]
Tarbox

[11] Patent Number: 6,154,732
[45] Date of Patent: *Nov. 28, 2000

[54] SYSTEM FOR PROVIDING INVESTMENT ADVICE AND MANAGEMENT OF PENSION ASSETS

[75] Inventor: Brian Christopher Tarbox, Minnetonka, Minn.

[73] Assignee: GuidedChoice.com, San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/900,415

[22] Filed: Jul. 25, 1997

[51] Int. Cl.$^7$ .................................................. G06F 17/60
[52] U.S. Cl. ............................................. 705/36; 705/39
[58] Field of Search .............................. 705/36, 37, 38, 705/39, 35, 4, 10

[56] References Cited

U.S. PATENT DOCUMENTS

| | | | |
|---|---|---|---|
| 4,742,457 | 5/1988 | Leon et al. | 364/408 |
| 4,953,085 | 8/1990 | Atkins | 705/36 |
| 5,220,500 | 6/1993 | Baird et al. | 364/408 |
| 5,615,109 | 3/1997 | Eder | 395/208 |
| 5,774,881 | 6/1998 | Friend et al. | 705/36 |
| 5,784,696 | 7/1998 | Melnikoff | 705/36 |
| 5,806,049 | 9/1998 | Petruzzi | 705/36 |

OTHER PUBLICATIONS

Tim McCollum, "Adding Some Byte to Retirement Plans", Nation's Business, v. 84, n. 8, pp. 52–55, May 1996.

Dialog, Database 16, "Of Mutual Interest: Mutual Fund News From the Vanguard Group", PR Newswire, Nov. 1994.

Rafter, Robert J. "The DOL 401(k) guidelines: How employees can separate information from advice", Compensation & Benefits review, vol. 28, No. 1, pp. 66–72, Feb. 1996.

Rohrer, Julie, "Advise and repent", Institutional Investor, vol. 27, No. 3, pp. 157–164, Mar. 1993.

Walter, Kate, "Make your 401(k) plan appeal to employees", HRMagazine, vol. 41, No. 11, pp. 117(9), Nov. 1996.

Tam Harbert, "The many benefits of going online", Computerworld, vol. 30, no. 32, p. 89, Aug. 5, 1996.

The Vanguard Retirement Planner, version 3.0 for Windows, Retirement Planning Software user's manual, 1995.

*Primary Examiner*—Allen R. MacDonald
*Assistant Examiner*—Alexander Kalinowski
*Attorney, Agent, or Firm*—Hopgood, Calimafde, Kalil & Judlowe

[57] ABSTRACT

A system and method for a data processor implemented system monitor for enabling individual employee participants to access independent professional money management for their Benefit Plan assets in a manner that is free from the traditional economic conflicts of interest inherent in previous systems is disclosed. The system and method are adapted to separate the investment management functions and fees thereof from the participant investment advice function and the fees thereof. The system and method collects, monitors and directs information from employee Benefit Plan accounts, employees, employers, fund managers and professional investment advisors to provide professional investment advice in a non conflict of interest manner and in accordance with the regulatory restraints of ERISA.

8 Claims, 4 Drawing Sheets

SYSTEM FOR PROVIDING INVESTMENT ADVICE AND MANAGEMENT OF PENSION ASSETS

BACKGROUND OF THE INVENTION

The present invention relates generally to an investment program which includes a system and a method for collecting, monitoring and directing data from Benefit Plan participants and beneficiaries ("participants"), Benefit Plan sponsors and fund managers and, more particularly, to a data processing system that collects, monitors and directs information from Benefit Plan participants, sponsors and fund managers, to provide professional investment advice to Benefit Plan participants while eliminating the inherent economic conflict of interest in traditional Benefit Plan programs.

The field of retirement savings has been greatly impacted by the vigorous growth of corporate Benefit Plans that offer individual accounts, allowing each participant to direct the investment of the assets allocated to his or her individual account. This practice of allowing each individual participant to manage his or her account has resulted in a need to provide investment advice to a large number of employees, heretofore unfamiliar with even the basics of investment portfolio management.

The entities most capable of providing such investment advice are the same entities that traditionally manage the investments of the commingled funds normally offered in Benefit Plans. Such investment managers receive most (if not all) of their compensation as a percentage of assets managed, with such percentages varying according to the nature of the risk associated with the commingled fund managed. For example an international equity fund would pay a manager a higher percentage resulting in a higher net profit than a domestic bond fund manager for funds having approximately the same assets under management.

Prior contemplated approaches to providing investment advice to Benefit Plan participants has a built in economic conflict of interest because the investment advisor traditionally receives higher net profits from some of the commingled funds provided versus others. This situation could lead to investment managerswho are also acting in the capacity of investment advisors consciously or subconsciously recommending or investing in funds that provide the investment advisor with a higher income, a situation possibly not in the best interest of the individual Benefit Plan participant.

Thus, there is a need for an investment program that eliminates this economic conflict of interest by separating the investment advice entity from the investment management entity. Such a system should provide compensation for investment advice totally independent of the investment management entity; should provide investment advice totally independent from and unrelated to the commingled Trust investment manager and should insure that the Trust investment manager has access only to the aggregate investment of each Benefit Plan and not by individual participants.

SUMMARY OF THE INVENTION

Therefore, an object of the present invention is to provide investment assistance to Benefit Plan participants in attaining an appropriate asset allocation for the assets in their individual accounts.

Another object of the present invention is to provide an investment program that increases utilization in self-directed Benefit Plans.

A further object of the present invention is to provide a worksheet that is used to determine an appropriate investment vehicle for each individual Benefit Plan participant.

A still further object of the present invention is to provide a recommendation written or otherwise in a tangible form for a specific investment vehicle based on an analysis of the worksheet.

The investment program which includes the present invention balances the rendering of investment advice with the long term goals of assets designated for retirement savings. The investment advice may be conveyed to each participant by a participant advisor. The investment advice is generated by a "Financial Expert" compensated in a manner totally separate and independent from the traditional investment management fees normally (a percentage of the assets under management) charged to commingled Trusts.

The system and method of the present invention eliminates possible economic conflict of interest by separating the investment advice entity from the investment management entity. The professional investment advisor receives fees totally independent from the fees charged for investment management. The investment advisor is totally independent from and unrelated to the commingled Trust investment manager. The system and method of the present invention assures that the investment manager is unaware of the individual pension participant investments, but rather sees only the aggregate investments of a Benefit Plan sponsor.

One aspect of the present invention is a unique data processing system that provides expert independent investment advice to Benefit Plan participants, at the same time offering professionally managed commingled investment Trusts at a more efficient cost structure and eliminates all of the conflicts of interest that would exist in all the presently known schemes of providing investment advice to Benefit Plan participants.

One representative system for providing asset allocation advice to individuals includes a data storage for storing data from a plurality of worksheets, each worksheet being completed by an individual; means for processing the data from each individual such that each individual's risk tolerance is calculated; an asset allocation model for at least two (2) Trusts, the Trusts including varying proportions of shares in a plurality of investment vehicles; means for correlating the calculated risk tolerance with an appropriate Trust; and means for generating a tangible report recommending at least one (1) of the at least two (2) Trusts as an appropriate investment vehicle for each individual.

One representative computer implemented method for providing independent expert investment advice to individuals for investing in professionally managed, cost efficient, commingled investment trusts while eliminating the conflict of interest between the investment advice and the trust management includes the steps of: developing a worksheet to elicit the funding needs and levels of risk tolerance appropriate for each individual; developing a risk profile which includes standards to take into account participants "fear factor" such that the investment recommendation given is likely be followed by the individual over a long period of time; developing an asset allocation model for at least two (2) investment vehicles using generally accepted principles of modern portfolio theory; applying the data from the worksheets to the asset allocation model; determining an appropriate investment vehicle for the individual; and providing a recommendation to the individual of at least one (1) of the at least two (2) investment vehicles.

Other objectives and advantages of the present application will become apparent from the following description, the accompanying drawings and the appended claims.

DETAILED DESCRIPTION OF THE INVENTION

Figure 1:
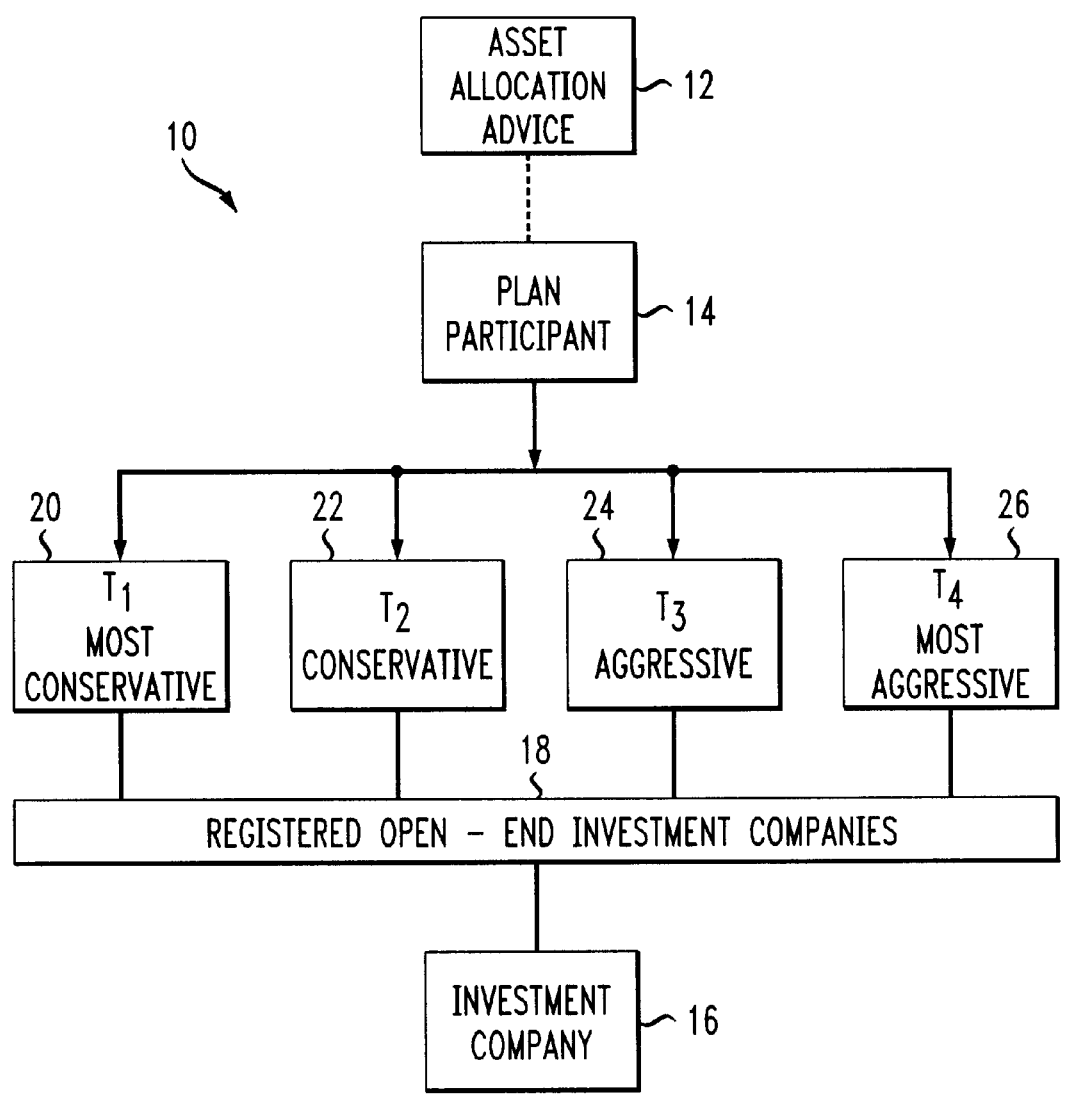
FIG. 1 is a block diagram generally illustrating the structure of the investment program including the system and method of the present invention.

In carrying out the present invention in preferred forms thereof, we have provided an investment program 10 (see FIG. 1) which includes systems and methods for providing professional asset allocation advice services 12 to individual participants 14 in Benefit Plans for allocating their account balances in a Trust(s) 20, 22, 24, 26 specifically tailored to their individual risk tolerances and retirement funding needs. The systems and methods of the present invention are particularly valuable because they provide individual plan participants 14 with much needed advice while taking into account the individual plan participant's risk tolerances so that each individual plan participant will likely hold the recommended Trust (investment) during the inevitable downturns in the market and, in fact, the Trusts will be professionally managed to exploit opportunities in a down market that most individual plan participants would not or could not exploit. The system and methods of the present invention are userfriendly in that they are specifically designed to eliminate the confusion from self-directed individual plan account balances while possibly increasing the rates of Benefit Plan utilization.

In the system and method of the present invention, investment advice is provided directly to Benefit Plan participants, such as, for example, participants in plans described in §401 (k), of the Internal Revenue Code of 1986, Keogh Plans, IRAs which provide for participant self-direction. Under the program 10 which includes the system and method of the present invention, an investment advisor or asset allocation advisor 32 makes a recommendation 44 in tangible form to each individual plan participant 14 of one of a plurality of life cycle Trusts 20, 22, 24, 26 maintained under the program as an investment vehicle for investing the participants plan account balance.

Figure 2:
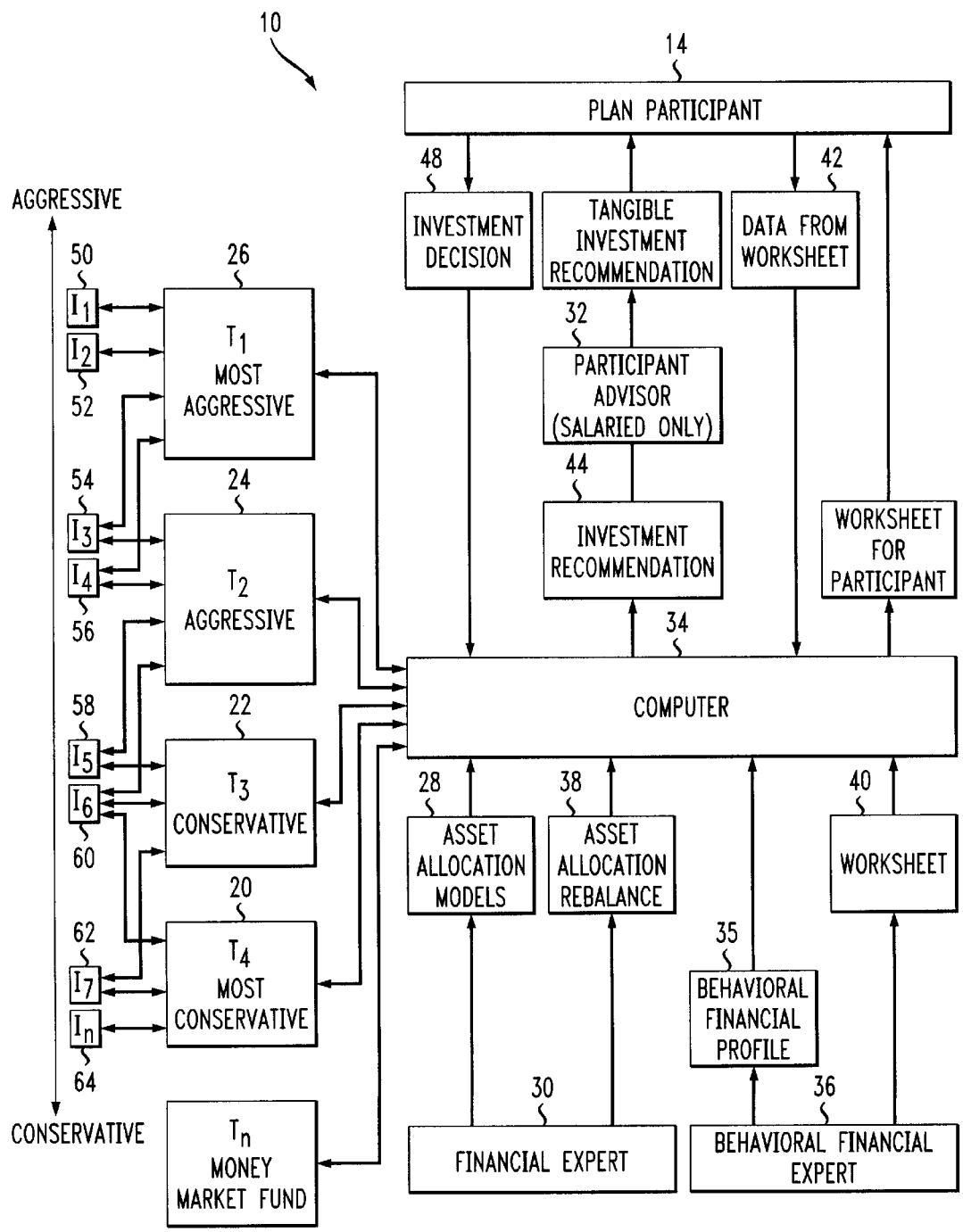
FIG. 2 is a detailed block diagram of the implementation of the investment program incorporating the systems and methods of the present invention.

As shown in FIGS. 1 and 2, it is presently anticipated that at least four and possibly more such life cycle Trusts 20, 22, 24, 26 would be structured as, presently preferred, at least four separate commingled Trusts and a money market fund, a guaranteed investment contract or similar vehicle. Each Trust will hold, in varying proportions, shares of some or all of a plurality of mutual funds of an open ended management investment company 18. The investment advisor 32 directly assists participants 14 in making appropriate investment decisions to achieve two important goals: (1) increased Benefit Plan utilization and (2) rendering assistance to each individual Benefit Plan participant such that each participant is likely to attain an appropriate asset allocation for the assets in their individual plan accounts.

Appropriate asset allocation is essential to realizing favorable market returns. Appropriate asset allocation is often a function of an individual plan participant's stage of life. It is generally accepted that younger participants with longer life time horizons should invest in more equity-weighted Trusts, whereas older participants with shorter life time horizons and lesser funding needs should invest in more bonds/money market-weighted Trusts. The initial four different Trusts are designed to assist any particular participant in achieving his or her retirement funding needs by varying the weightings of each Trusts holdings in, presently preferably, a plurality of no-load mutual funds. Thus, each Trust is tailored to meet different retirement investment needs. The recommended course of action provided by the investment advisor to each participant is designed to incorporate the prudent practices and procedures of retirement funding applicable to defined Benefit Plans and is provided in a simple and user-friendly form to defined Benefit Plan participants.

Any solution to the problem of Benefit Plan participants allocating their account balances in less than an optimal manner must take account of the typical participant's tendency to change investments in reactions to short-term performance trends. Short-term market volatility has proven to be the nemesis of individual investors, influencing them to "buy high and sell low."

The first step in determining an appropriate Trust for any one individual participant is to determine his or her risk tolerance, among other criteria. A worksheet 40, as will be explained later, is used to elicit the information necessary for the investment advisor 32 to recommend the Trust appropriate for each individual participant. This is accomplished by determining from each plan participant into which Trust he or she should invest, taking into account the "fear factor" (i.e. the typical participant's inordinate fear of losing any money) and the expected fluctuation in net asset value of each Trust.

Each Trust is a portfolio containing varying percentages of different asset classes through its investments in the plurality of mutual funds. This design was implemented to take into account the fact that the investment performance of different asset classes is imperfectly correlated, thus, buffering short-term fluctuations in the investment portfolio's overall value.

Because plan participants will see only the net asset value and fluctuation at the investment portfolio level, i.e., of the Trust itself, they will not be unduly alarmed by fluctuations in the values of the shares of any one mutual fund or other investment vehicle incorporated in the Trust.

Furthermore, since each Trust is a portfolio of composite asset classes through its investment in the plurality of mutual funds, fluctuations in the value of the shares of individual mutual funds should mitigate portfolio or Trust fluctuations. This should help protect plan participants from subscribing to the temptation of selling a falling asset class in a down market. In fact, quite the opposite is believed will occur in the present program, in that to be maximally advantageous to plan participants, the asset classes in each Trust will be periodically re-balanced according to criteria provided by a Financial Expert 30, as will be explained later.

As mentioned above, the investment options available under the asset allocation program of the present invention are, presently preferably, initially a selection of at least four Trusts and, if not otherwise available from a Benefit Plan, a money market fund, a guaranteed investment contract or similar vehicle.

Each Trust holds shares in a plurality of mutual funds in varying proportions. The mix of the plurality of mutual funds in each Trust will be designed to accommodate the different investment strategies of each of the Trusts. In this connection, the Trust range from aggressively structured (generally composed of mutual funds which invest mainly in equities) to conservatively structured (generally composed of funds which invest mainly in fixed income instruments). The Trusts will comprise all or some of any particular Benefit Plans investment alternatives. As presently preferred, each mutual fund has a different investment objective and will be selected from those, presently preferably, available to institutional investors which typically require a minimum investment of about $250,000 and a minimum of $25,000 for additional investments, except for the money market fund which, presently preferably, requires a minimum initial investment of $100,000 and a minimum of $1,000 for additional investments with the minimums being waivable. The, presently preferred, at least four Trusts invest exclusively in shares of some or all of the mutual funds in varying proportions, so that each Trust accommodates different investment needs and risk tolerances, as determined by the Financial Expert.

The Trusts are designed to provide appropriate asset allocations for at least four different "profiles" of participants, with the salient factors being; financial objectives, time horizon, other savings and risk tolerance.

One key to the investment program which includes the present invention is the independent Financial Expert 30 that constructs appropriate asset allocation models 28 for each Trust. The appropriate asset allocation models 28 are constructed using generally accepted principles of modern portfolio theory. The Financial Expert is independent from and has no preexisting relationship with and is no way under the control of the Mutual Fund management or the investment company. The Financial Expert's formulation of asset allocation models may include algorithms, studies, analytics, research, models, papers and other word product or relevant materials as the investment manager determines might be of assistance or interest to the Financial Expert. Furthermore, the Financial Expert, at his sole and absolute discretion, may seek the assistance of others in formulating the asset allocation models.

However, in all cases, the Financial Expert 30 retains the ultimate control and discretion with respect to the development and maintenance of the asset allocation models 28. The Financial Expert 30 is entirely responsible for determining how the allocation models 28 are best implemented and, thus, will select the mutual funds each Trust will hold and the weightings thereof in order to be compliant with the developed asset allocation model. The asset allocation models 28, as expressed in an asset allocation computer program, when implemented will not be static, but rather the Financial Expert in his sole and absolute professional discretion may make adjustments to the asset allocation models for the Trusts, taking into consideration the investment goals and risk tolerances that the asset allocation models represent and to account for changes in the economy and market conditions. Thus, the Trusts will employ, for the benefit of participants, concepts based on funding needs and proscribed risk tolerances uninfluenced by the compensation interests of Mutual Fund management.

Once the Trusts are appropriately invested in the plurality of mutual funds, disproportionate investment performance by the plurality of mutual funds will cause the Trust investment mix to drift from the Trust asset allocation model. At this point, the Financial Expert 30 will develop a mechanical formula incorporated in an appropriate computer implemented program to re-balance 38 the relative proportions of the mutual funds in each Trust on a predetermined basis. Such formula and the basis upon which the composition of the Trust is designed will be made available to each Benefits Plan independent fiduciary prior to the Benefits Plan investing in the investment program which includes the system and method of the present invention.

The investment program 10 which includes the system and method of the present invention is based on a very simple idea: to provide the individual plan participant responsible for the investment of his or her account balance with a convenient, user-friendly way to benefit from the knowledge and experience of professional investment advisors and thereby receive investment advice concerning which Trust represents an appropriate allocation of assets in that individual's account under the Benefit Plan. As presently preferred, the investment program of the present invention will be made available only to sophisticated Benefit Plans, i.e. those with a minimum of $5,000,000 in assets.

One of the primary goals of the investment program of the present invention is to make investment decisions as simple and user-friendly as possible, while maintaining integrity and accuracy in the investment advice proffered. These goals are accomplished by the investment advisor acting as a fiduciary in making a specific investment recommendation based solely upon information provided for, by or on behalf of Benefit Plan participants. This investment advice will be based, at least in part, upon the answers to questions included in the worksheet, mentioned earlier, designed by a Behavioral Finance Expert 36. The worksheet 40, is designed to elicit the funding needs and levels of risk tolerance appropriate for each individual participant. The Behavioral Finance Expert will formulate a risk profile and will develop standards which take into account participants "fear factor," thus allowing the investment advisor to provide an investment recommendation that the participant is more likely to follow and maintain over a long period of time.

One important factor in the preparation of the investment recommendation will be each participants response when asked what he or she would do if a loss, equaling the largest loss that could occur in the great majority of likely scenarios, would actually occur. If the answer indicates that the participant would sell his or her shares in a specific Trust in the face of such a loss, a more conservative Trust would be recommended to those participants.

The worksheet 40 will be made available to the participants in many forms, including, but not limited to, hard copies with written instructions and employee enrollment in general information meetings through the Intranet (a secured access subset of the Internet), on computer terminals at the office of the Benefit Plan sponsor or the Benefit Plan sponsor's page on the Worldwide Web etc. Completing the worksheet by the participants will be interactive for computer-oriented participants. Such computer-oriented participants would merely enter as access code which could be their Social Security numbers and much of the information that the participants working with the worksheet will be automatically provided, typically by the Benefit Plan sponsor, such as, for example, age, value of the Benefit Plan's assets, annual salary, etc. If any participant does not understand a question during completion of the worksheet by computer, assistance will be provided via the computer such that the participant receives a detailed explanation to each question. Further, toll-free telephone discussions with participant advisors will be available as well as face to face discussions for answering participants questions.

The answers to the questions contained in the worksheet which measure risk tolerance are key to providing impartial investment advise to plan participants. The results of the participants risk profile as determined from the answers to the questions in the worksheet will only be used to recommend the same or a less aggressive Trust. In this situation, the investment advisor will be in the position of recommending a more conservative Trust then would be the case if the worksheet had only a mathematical basis and had no behavior finance component. Thus, by incorporating the behavior finance component in the worksheet as fundamental in determining the appropriate Trust, the inherent conflict of interest which can result from the way fees are traditionally paid in conventional investment vehicles is effectively eliminated.

Specifically, under conventional investment programs, by recommending a more aggressive Trust, the typical mutual fund manager would receive higher fees and net profits, because equity based mutual funds typically pay the managers more than bond based mutual funds.

Upon completion of the worksheet 40, each participant's response 42 is analyzed and a recommendation 44 of an appropriate Trust is provided to each participant 14. This recommendation of a particular Trust is designed to assist each participant in choosing the appropriate asset allocation based on the participant's risk profile, retirement needs and life cycle stage.

The data collection process leading up to the recommendation is designed to provide participants with a better understanding of the program by emphasizing its purpose and goals. Such understanding should better enable participants to maintain their investment in the Trust which is ultimately recommended because maintaining such position is consistent with the information supplied by the participants themselves via the worksheets.

Of course, each recommendation will result from inputting the information supplied by or on behalf of the participants into the computer programs which contain parameters supplied by the Financial Expert 30 and the Behavioral Finance Expert 36. Neither the investment manager nor the participant advisor 32 has any ability to affect or vary the output of the respective computer programs. Whether a participant 14 elects to invest in the recommended Trust(s) is entirely within the participant's discretion; in other words, the participant may disregard the recommended Trust(s), yet still invest in other Trust(s). Moreover, the present investment program imposes no limits on how often a participant may change his or her investment election. Thus, theoretically, a participant could change the investment selection any day the stock and bond markets trade; however, Benefit Plan sponsors might, as a matter of design, impose limits.

A system monitor 66 completely independent of the plurality of mutual funds managers 16 and upon receiving instructions from an individual plan participant 14, will provide benefit individual plan participants with tangible confirmation of each participants transactions, and, further, quotations of the participant's Benefit Plan account will be available by telephone. Both participants and Benefit Plan independent fiduciaries will receive periodic information describing the performance of each individual Trust during the preceding period, market conditions and economic outlook and, if appropriate, prospective changes in the asset allocation model and the reasons therefor.

The participant advisor 32 receives a reasonable compensation which is not tied to the level of the assets under management in the Trusts. Under the present investment program which incorporates the system and method of the invention, there will be no separate fee paid at the Trust level for asset allocation services. Only the fees from the mutual funds that are charged to all investors and other reimbursable direct expenses will be charged to the Benefit Plan(s). However, the fees for the Financial Expert 30, the Behavioral Finance Expert 36, the development of the risk tolerance component of the worksheet, expenses payable to regulatory authorities, accounting, auditing and legal expenses, clerical and administrative expenses, expenses of printing and mailing of reports, expenses for computer programmers, certain insurance (including errors and omissions) and fidelity bond premium and other expenses incurred by each Trust in the ordinary course of business will be payable to the investment advisor.

The investment program 10 which includes the system and method of the present invention, as described above, provides a mechanism for Benefit Plans to provide their participants with professional investment advisory services regarding the investment of their account balances in Trust (s) specifically tailored for their risk tolerance and retirement funding needs. The program is particularly valuable because it provides participants with much needed advice which takes into account the participant's risk tolerances so that participants will likely hold the recommended Trust(s) during the inevitable downturns in the market. The Trust(s) are professionally managed through asset allocation models incorporated in computer implemented programs as defined by an Independent Financial Expert 30 (through their own internal management of assets and through re-balancing) to exploit opportunities in a down market that most participants would not or could not exploit. It is believed that Benefit Plans, which provide this particular investment program in order to assist their participants in achieving appropriate asset allocations are providing an investment program that is user-friendly and at least reduces the pain and the confusion out of self-direction of account balances, and, may also result in increased rates of Benefit Plan utilization.

With the system and method of the present investment program, individual participants 14 are protected from over-reaching and self-dealing by safeguards designed into the program itself. Specifically, the Trust(s) manager will provide the independent fiduciary of each Benefit Plan with a current prospectus covering the plurality of mutual funds and full and written disclosure of the investment managements fees and all other expenses and transaction costs charged to or paid by the Benefit Plan at both the mutual fund and Trust level. The Benefit Plan independent fiduciary alone will determine to select and retain the investment program including the present invention for the Benefit Plan. Any individual Benefit Plan will pay no more or receive no less for units in the Trust or shares of the mutual funds than the Benefit Plan would have paid or received in an arms-length transaction with an unrelated party. The mutual fund shares owned by the Trusts will, presently preferably, be no-load mutual funds which trade at net asset value and the Trusts trade at the net asset value of the amalgam of the plurality of mutual funds in which they are invested (less accrued Trust expenses), i.e., the amounts paid or received are derivative. The broker-dealers who effect and execute trades on behalf of the mutual funds are engaged on a "best execution" basis and are independent of and unaffiliated with the Trust manager.

The asset allocation of the Trusts are constructed by the Financial Expert 30, a party independent from the investment advisor, using generally accepted principles of modern portfolio theory. No more than five percent (5%) of the financial expert's gross income in any one of his taxable years will be derived from the financial advisor or its affiliates.

The allocation models 28 will be entirely developed, maintained and if necessary modified by the Financial Expert. Separate Trusts, which a Benefit Plan sponsor constructs based on different weightings of the mutual funds, may be utilized if the Financial Expert approves of such modification as being appropriate for that type of Trust. Re-balancing of each Trust will occur on a basis determined by the Financial Expert. The re-balancing will be purely objective, automatic and mechanical, with the exclusive goal of maintaining the asset allocation model. Because the mutual funds selected for the present investment program have considerable assets under management and, thus, the mutual funds are independently viable in the institutional market. Further, outside the investment program which includes the system and method of the present invention, the minimum investment in each mutual fund is generally about $250,000. The fee structure of the mutual funds selected is lower than the fee structure in the "retail" market typically available to the individual participant. The Benefit Plans are, thus, able to take advantage of institutional pricing as a result of their participation in the present investment program. Additionally, the investment company 16 responsible for the trust managers and employs the participant advisors 32 will not receive any fees other than those charged by the plurality of mutual funds and will receive reimbursement only for those "direct expenses" associated with operating the program or other expenses which it pays to unrelated third parties, as described above.

FIG. 1 is a block diagram generally illustrating the structure of the investment program 10 including the system and method of the present invention. As shown, investment advice regarding appropriate asset allocation 12 is provided directly to each participant 14 depending upon the criteria discussed earlier. Fund management advice under control of the investment company 16 is provided directly to the mutual funds 18. The composition of the Trusts 20, 22, 24, 26 is determined by the asset allocation model 28 (See FIG. 2), for each Trust, as dictated by an independent Financial Expert 30. Thus, the separation of the investment advice function from the Trust management function is achieved.

As shown, in a Benefit Plan, such as, for example, a 401(k) Benefit Plan, participants 14 may receive asset allocation advice 12, directly from a participant advisor 32 that is separated from both the Financial Expert 25 and the Mutual Fund managers under the control of the investment company 16. Based upon this advice, the participants then invest in one or any number of a plurality of different Trusts, such as, for example, a most conservative Trust 20, a conservative Trust 32, an aggressive Trust 24, or a most aggressive Trust 26. As shown, the participant advisor 32 that provides the investment recommendation to the Benefit Plan participant 14 and the plurality of Mutual Funds management advisors controlled by the investment company 16 are two entirely separate entities and are compensated according to entirely different compensation plans.

FIG. 2 shows a detailed block diagram of the implementation of the investment program incorporating the systems and methods of the present invention. As shown, a computer 34 receives inputs from the Financial Expert 30 and the Behavioral Finance Expert 36. Specifically, as discussed above, the asset allocation models 28 developed by the Financial Expert 30 and at an appropriate time, an asset re-balancing model or computer program 38 are loaded into the computer 34. A worksheet computer program prepared by a computer programmer incorporating the worksheet 40 developed by the Behavioral Finance Expert 36 is loaded into the computer 34. The worksheet 40 is then transmitted by the computer 34 to either the participant advisor 32 for transmission to the plan participant 14 or directly to the plan participant. Upon receiving the worksheet 40, the plan participant fills out the worksheet 40 and then the data 42 from the worksheet 40 is either provided to the participant advisor 32 for entering into the computer 34 or the data from the worksheet 40 is entered directly into the computer 34 by the plan participant 14. Upon receiving the data 42 from the worksheet, the computer 34, taking into consideration the asset allocation models 28 and the psychological profile 35 provided by the Behavioral Finance Expert 36, calculates an investment recommendation 44. The investment recommendation 44 is communicated to the participant advisor 32 who translates that recommendation into a tangible investment recommendation 46 which is then transmitted to the plan participant 14. Upon receipt of the tangible investment recommendation 46, the plan participant 14 makes an investment decision 48 which is communicated either directly to the computer 34 or to the computer through the participant advisor 32. Upon receipt of the investment decision 48, the computer 34 allocates certain shares of the elected Trust or series of Trusts 20, 22, 24, 26 which in turn may require the Trust or Trusts elected to adjust the amount of shares of the various investment vehicles 50, 52, 54, 56, 58, 60, 62, 64 contained in the Trust.

Figure 3:
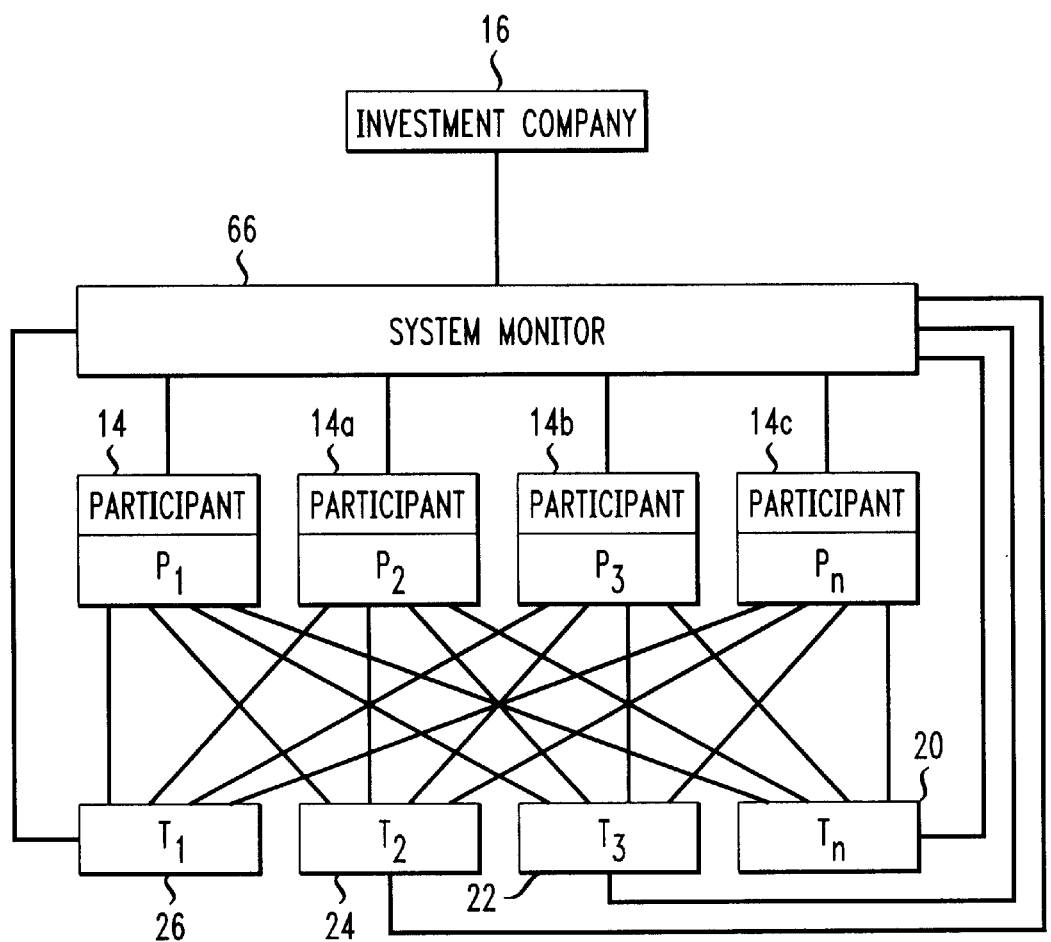
FIG. 3 is a diagram illustrating the investment advice and management system of the present invention as seen by each individual plan participant.

FIG. 3 is a schematic representation of the 25 investment program structure as seen by each participant 14, 14a, 14b, 14c. In this scheme, the participant advisor 32 communicates with a system monitor 66 controlling the computer 34 which in turn communicates with each Benefit Plan participant 14, 14a, 14b, 14c.

The computer based system monitor 66 collects data from each Trust 20, 22, 24, 26, and keeps track of each Participant Accounts in each Trust. The computer based system monitor 66 also collects data and transaction instructions from the Investment Advisor 32 and carries out transactions transferring Participant Account Trust assets among the Trusts as directed by each participant through the participant advisor. Additionally, the system monitor 66 aggregates and nets the transactions between the Participant Accounts and the Trusts for all participants and Trusts.

The system monitor 66 provides data indicating the total aggregate balances and transactions between each Trust and each of the plurality of mutual funds (see FIG. 2) but not individual participant account balances and transactions to each mutual fund manager 16 (see FIG. 1).

The investment company 16 gathers data from the system monitor 66 sufficient to calculate the investment advisory fees. These fees are presently anticipated to be in the form of an hourly fee, a per capita fee, or an asset based fee or any combination of the foregoing.

Figure 4:
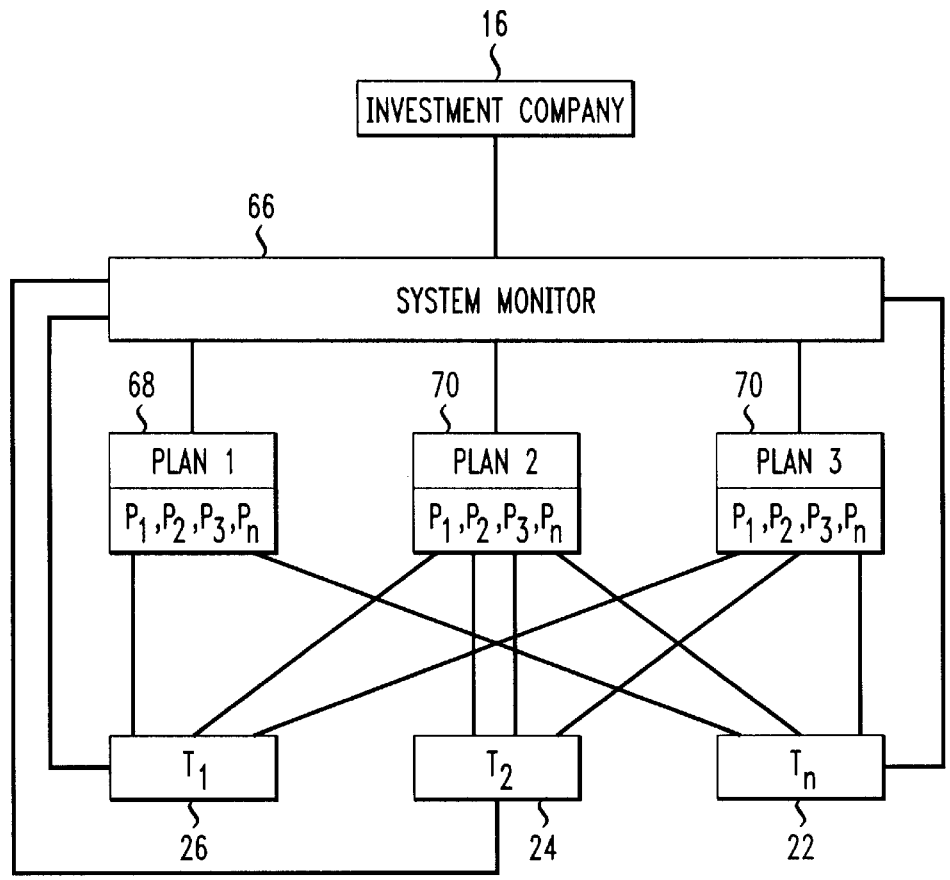
FIG. 4 is a diagram illustrating the investment advice and management system of the present invention as seen by benefit plans.

As shown in FIG. 4, the system monitor 66 gathers and processes data from the Participant Account in Trusts and aggregates the accounts by separate and distinct Benefit Plans 68, 70, 72. For each Benefit Plan, the total Participant Account in Trusts within that Benefit Plan, the system monitor 66 calculates and reports to each Benefit Plan trustee and plan sponsor the total Participant Account assets in Trust in each Trust. Transactions will be "netted" and aggregated within each Benefit Plan and the system monitor "nets" and aggregates transactions across some or all Benefit Plans when required.

The system monitor 66 also calculates and reports the investment advisory fees for each individual Participant Account assets in Trust and in aggregate for each Benefit Plan. The system monitor 66 debits each Trust for the total amount of investment advisory fees due from the assets of each Trust. The Trust Manager is directed to transfer moneys to the investment company 16. The system monitor 66 calculates and reports the total investment advisory fees paid by each Participant Account in Trust assets, by each participant 14, 14a, 14b, 14c and by each Benefit Plan 68, 70, 72.

The data processing system used by the system monitor insulates the investment company and its fees from the Trust Fund Manager and its fees by maintaining separate files and cells for each of the aforementioned and other fees. This insulation and masking of the fees from each party removes any economic or profit incentive to direct Participant Account Trust asset funds into Trusts generating higher fees that may be inappropriate for the particular participant but are more profitable to either the Trust Fund Manager or the investment company. The system monitor computer program, in its initial form, will be initially designed and constantly updated to follow and adhere to all ERISA and other regulatory constraints and requirements.

Figure 5:
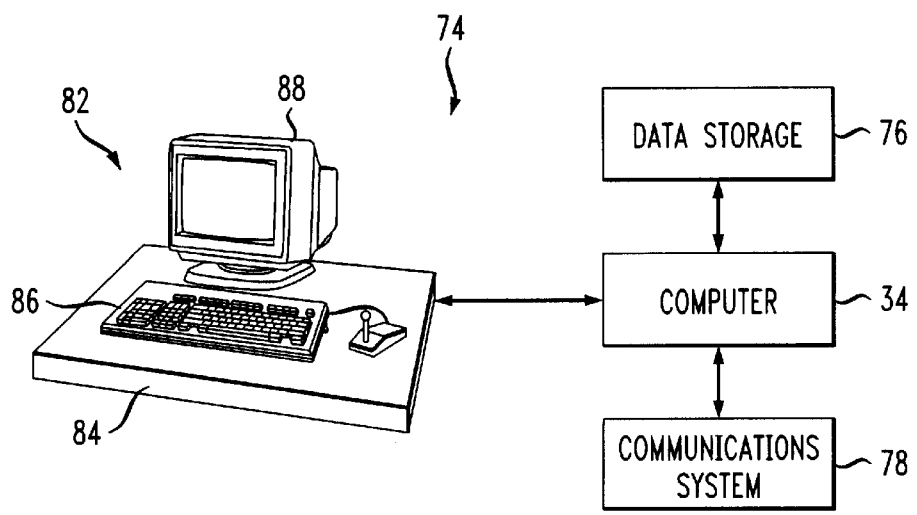
FIG. 5 is a schematic diagram of representative computer hardware useful with the present investment advise program.

The investment advise program which includes the system and method of the present invention may require certain computer hardware 74, including but not limited to, a mainframe computer or server(s) 34 for processing large volumes of data stored in a data storage unit 76 and a communications system 78, including, but not limited to, intranet, internet, and other communication vehicles, as is known to those skilled in the art (see FIG. 5). The stored data 80 is taken from the worksheets 40 completed by each participant, as described above. A personal computer or workstation 82 having a hard drive 84, an input device such as a keyboard 86 and mouse, and an output device such as a display 88 and printer are operatively connected to the computer 34, as is known to those skilled in the art. The computer 82 is used to communicate with and monitor the computer 34, as is known to those skilled in the art. In particular, the asset allocation model computer programs and the behavioral financial computer programs loaded on the computer 34 are accessed and used to transmit via the communications system 78, the investment advice, in a tangible form, to each participant, as is known to those skilled in the art.

The investment program described above is believed to be particularly attractive to Benefit Plans and their participants and beneficiaries because such participants will receive professional advisory services for investment of their account balances in Trusts specifically tailored for their risk tolerance and retirement funding needs. The investment program provides participants with much needed investment advice which takes into account participants risk tolerances so that participants will likely hold the recommended Trust during the inevitable downturns in the market, and, in fact, as mentioned above, the Trusts will be professionally managed to exploit opportunities in a down market that most participants would not or could not exploit. Hence, the participants will be assisted in achieving appropriate asset allocation. Moreover, since the program will be "user-friendly" and will take the confusion out of self direction of account balances the program may also result in increased rates of Benefit Plan utilization.

Changes and modifications in the specifically described embodiments can be carried out without departing from the scope of the invention which is intended to be limited only by the scope of the appended claims.

What is claimed is:

1. A system for providing investment recommendations to individuals comprising:
 a data storage device for storing data from a plurality of worksheets, each worksheet being completed by an individual;
 a recommendation generating mechanism for substantially eliminating a conflict of interest between an investment recommendation provider and a fund manager; the recommendation generating mechanism comprising:
  (a) a processor for processing the data from each of respective individual worksheets to calculate a corresponding individual risk tolerance;
  (b) an asset allocation model adapted for being applied to at least two groups of investments, wherein each group of investments includes varying proportions of shares in a plurality of investments;
 the processor using the asset allocation model to correlate the calculated individual risk tolerance with a corresponding group of investments; and
  (c) an output mechanism, coupled to the processor, for generating a report recommending at least one of the at least two groups of investments as an appropriate investment for each individual; wherein the report sets forth a range of returns for at least one of the two groups of investments as a function of time.

2. The system of claim 1 wherein the processor is adapted to process the data from each individual such that the recommendation generating mechanism generates the report based upon at least one of individual retirement needs and individual life cycle stage; and
 the processor further includes a correlation mechanism for correlating the retirement needs and life cycle stage with an appropriate group of investments.

3. A system for providing investment recommendations to individuals as set forth in claim 1 wherein the recommendation generating mechanism further includes a mechanism adapted to accept data related to past performance of the recommended group of investments during a specified period of time, and, on a substantially periodic basis, providing a performance update report to the output mechanism indicative of a rate of return for the recommended group of investments over the specified period of time.

4. A system for providing investment recommendations to individuals as set forth in claim 3 wherein the recommendation generating mechanism further includes a mechanism adapted to accept data related to past performance of at least two groups of investments, including the recommended group of investments and another group of investments, during a specified period of time, and, on a substantially periodic basis, providing a performance update report to the output mechanism indicative of a first rate of return for the recommended group of investments and a second rate of return for the another group of investments over the specified period of time.

5. A computer implemented method for providing independent investment recommendations to individuals for investing in managed funds, the method comprising the steps of:
 substantially eliminating a conflict of interest between an investment recommendation provider and a fund manager by:
 developing a worksheet to elicit input parameters including funding needs so as to enable calculation of individual levels of risk tolerance appropriate for an individual, calculating a risk profile for the individual which considers a "fear factor" indicative of a probability that the investment recommendation given is likely to be followed by the individual over a period of time;

applying an asset allocation model to at least two investment vehicles;

applying the data from the worksheets to the asset allocation model; and based upon the calculated risk profile, providing a tangible recommendation to the individual of at least one of the two investment vehicles, wherein the recommendation sets forth a range of returns for at least one of the two investment vehicles as a function of time, and wherein the recommendation is generated independently of the fund manager.

6. A computer implemented method for providing independent investment recommendations to individuals for investing in managed funds as set forth in claim 2, further comprising the steps of:

accepting input data related to past performance of at least two groups of investments, including the recommended group of investments and another group of investments, during a specified period of time, and on a substantially periodic basis, generating a tangible performance update report indicative of a first rate of return for the recommended group of investments and a second rate of return for the another group of investments over the specified period of time.

7. A computer implemented method for providing investment advice to individuals, the method comprising the steps of:

eliminating a conflict of interest between an investment recommendation provider and a fund manager by:

collecting data from a worksheet completed by an individual;

calculating a risk tolerance for the individual;

applying an asset allocation model to at least four Trusts, the Trusts having shares in varying proportions of a plurality of no-load mutual funds;

applying the calculated risk tolerance to the asset allocation model for the at least four Trusts; and generating a tangible report recommending at least one of the at least four Trusts as an appropriate investment vehicle for the individual, wherein the report is generated independently of the fund manager.

8. A computer implemented method for providing independent investment recommendations to individuals for investing in managed funds as set forth in claim 7, further comprising the steps of:

accepting input data related to past performance of at least two groups of investments, including the recommended group of investments and another group of investments, during a specified period of time, and on a substantially periodic basis, generating a tangible performance update report indicative of a first rate of return for the recommended group of investments and a second rate of return for the another group of investments over the specified period of time.

\* \* \* \* \*